United States Patent
Jia et al.

(10) Patent No.: US 11,568,322 B2
(45) Date of Patent: *Jan. 31, 2023

(54) USING A CLIENT-SIDE MACHINE LEARNING MODEL DYNAMICALLY IN A MOBILE ENTERPRISE APPLICATION ON A MOBILE DEVICE

(71) Applicant: salesforce.com, inc., San Francisco, CA (US)

(72) Inventors: Si Jun Jia, San Francisco, CA (US); Yunxi Jia, San Francisco, CA (US); Jason Nassi, San Francisco, CA (US)

(73) Assignee: SALESFORCE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/489,324

(22) Filed: Sep. 29, 2021

(65) Prior Publication Data
US 2022/0019941 A1    Jan. 20, 2022

Related U.S. Application Data

(63) Continuation of application No. 16/539,926, filed on Aug. 13, 2019, now Pat. No. 11,170,322.

(51) Int. Cl.
*G06N 20/00* (2019.01)
(52) U.S. Cl.
CPC .................. *G06N 20/00* (2019.01)
(58) Field of Classification Search
CPC ..... G06F 8/71; G06F 8/65; G06F 8/61; G06F 9/44526; G06N 20/00
See application file for complete search history.

(56) References Cited

U.S. PATENT DOCUMENTS 5,577,188 A    11/1996  Zhu
5,608,872 A    3/1997   Schwartz et al.
(Continued)

OTHER PUBLICATIONS

J. Echessa, "A Look at Android ML Kit," published Jul. 24, 2018, downloaded from https://authO.com/blog/ a-look-a t android-ml-kit-the-machine-learning-sdk/ (Year: 2018).

(Continued)

*Primary Examiner* — Eric J Yoon
(74) *Attorney, Agent, or Firm* — Schwabe Williamson & Wyatt (57) ABSTRACT

A computer-implemented method comprises receiving by a servers of a development platform, an upload of a trained ML model and configuration data from a tenant user, for use by a mobile enterprise application that is made available to one or more tenants of the development platform, the mobile enterprise application capable of invoking the trained ML model, wherein the configuration data defines an input data format and an output data format of the trained ML model. The server generates API based on the configuration data and downloading the API to the mobile enterprise application, wherein the generating the API is performed without using an API provided by the tenant user. The generated API is further configured to pass input in the input data format to the trained ML model and configured to receive output in the output data format from the trained ML model for further processing or display.

19 Claims, 8 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0132584 A1 | 5/2013 | Palladino |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2014/0366000 A1* | 12/2014 | Batabyal .................. G06F 8/61 717/120 |
| 2016/0092179 A1* | 3/2016 | Straub ...................... G06F 8/71 717/107 |
| 2019/0156246 A1 | 5/2019 | Kuo |
| 2021/0049497 A1 | 1/2021 | Jia et al. |

OTHER PUBLICATIONS

D. Elliott, "A guide to the Google Play Console," published Mar. 9, 2018, downloaded from https://medium.com/googleplaydev/ a-guide-to-the-google-play-console-1bdc79ca956f (Year: 2018).

The Manifest website, "How to Publish an App on Google Play: A Step-by-Step Guide," published Jun. 15, 2018, downloaded from https://medium.com/@the manifest/how-to-publish-an-app-on-google-play-a-step-by-step-guide-80f9f533e370 (Year: 2018).

GBKSOFT website, "iOS 11 +: How to Update 32-bit Mobile App and Integrate New Features," published Jan. 4, 2018 as indicated by waybackmachine, downloaded from https://gbksoft.com/blog/ios-11-how-to-update-32-bit-mobile-app-integrate-new-features/( Year: 2018).

* cited by examiner

```
//Create URL to the source file you want to download
let fileURL = URL(string: remoteUrl)
let sessionConfig = URLSessionConfiguration.default
let session = URLSession(configuration: sessionConfig)
let request = URLRequest(url:fileURL!)
let task = session.downloadTask(with: request) { (tempLocalUrl, response, error) in
        if let tempLocalUrl =  tempLocalUrl, error  ==  nil {
        // Success
        If let statusCode  =  (response as?  HTTPURLResponse)?.statusCode {
                print(Sucessfully download. Status code: \(statusCode)")
        }
        do {
            if FileManager.default.fileExists(atPath: destinationFileUrl.path) {
                try FileManager.default.removeItem(at: destinationFileUrl)

try FileManager.default.copyItem(at: tempLocalUrl, to:destinationFileUrl)
            let compileUrl = try MLModel.compileModel (at: destinationFileUrl)

self.model = try MLModel(contentsOf: compiledUrl)

NotificationCenter.default.post(name:  .coreMLModelDidLoad, object:self, userInfo: nil)
        } catch (let writeError) {
            print("Error creating a file \(destinationFileUrl) : \(writeError)")
        }
```

FIG. 7

USING A CLIENT-SIDE MACHINE LEARNING MODEL DYNAMICALLY IN A MOBILE ENTERPRISE APPLICATION ON A MOBILE DEVICE The present application is a continuation application of U.S. patent application Ser. No. 16/539,926, filed Aug. 13, 2019, which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to enabling use of a custom machine learning service in a mobile enterprise application on a mobile device.

BACKGROUND

Cloud computing or database service companies provide enterprise cloud applications where cloud-based and local components worked together to service multiple customer organizations or companies. One example of a cloud computing company is Salesforce.com, Inc. (Salesforce), which provides a suite of enterprise applications for customer-relationship management (CRM), customer service, and marketing automation, and analytics. Cloud computing service companies may also provide application development platforms. Salesforce, for example, includes a platform as a service (PaaS) called the Lightning Platform that allows customers to create add-on applications that integrate into the main Salesforce application and/or the Salesforce mobile iOS app.

With the advent use of machine learning, customers of cloud computing services have an increased demand for machine learning services in their mobile apps. Mobile operating system (OS) providers attempt to meet this need by providing a software framework to their mobile operating systems that speeds up application tasks involving artificial intelligence, such as image recognition. As an example, Apple Inc. introduced to the iOS mobile operating system a machine learning service called Core ML that integrates machine learning models into iOS apps so that machine learning models run on mobile devices, rather than on a server.

Core ML is optimized for on-device performance, which minimizes memory footprint and power consumption. Running strictly on the device ensures the privacy of user data and guarantees that customer's app remains functional and responsive when a network connection is unavailable.

Currently, there is no existing solution for using a machine learning service such as Core ML in a Salesforce iOS app. To use Core ML, each Salesforce customer must instead create their own iOS native app designed for use with Core ML and use a Salesforce Mobile SDK to accesses Salesforce data through the mobile device's operating system rather than through a browser. In this case, Salesforce customers are not able to fully utilize the Salesforce iOS app and must instead build their own mobile app to use Core ML.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B." "B and C," "A and C" and "A, B and C."

Some implementations described and referenced herein are directed to systems, apparatus, computer-implemented methods and computer-readable storage media for identifying articles helpful in resolving user queries/requests.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise network is Lightning®, provided by salesforce.com, inc. of San Francisco, Calif. One example of an online enterprise social network is Chatter®, provided by salesforce.com. Salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system, Some of the described techniques or processes can be implemented without having to install software locally, that is, on computing devices of users interacting with services available through the cloud. While the disclosed implementations may be described with reference to Lightning® and/or Chatter® and more generally to enterprise social networking, those of ordinary skill in the art should understand that the disclosed techniques are neither limited to Lightning® or Chatter® nor to any other services and systems provided by salesforce.com, inc. and can be implemented in the context of various other database systems such as cloud-based systems that are not part of a multi-tenant database system or which do not provide enterprise social networking services.

I. EXAMPLE SYSTEM OVERVIEW

Figure 1A:
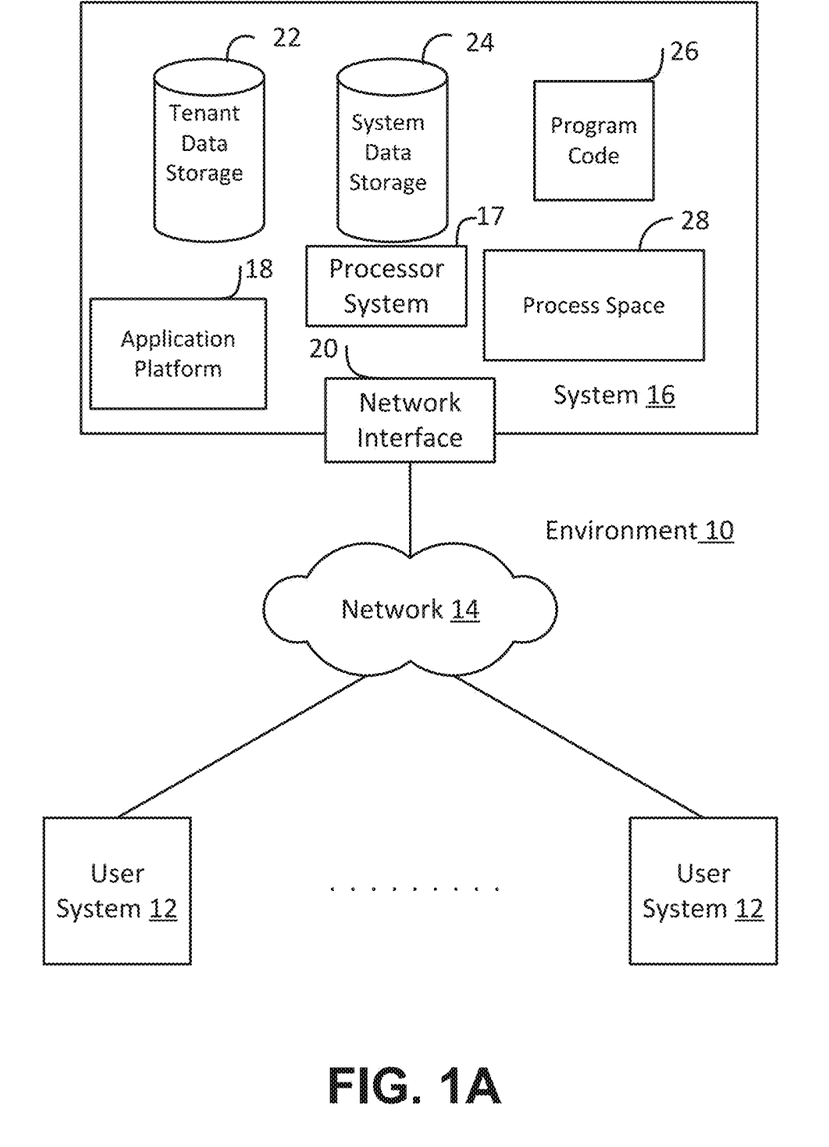
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system NTS), The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application, User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, ITP, AFS, WAP, etc. In an example where HTTP is used, each user system 12 can include an HTTP client commonly referred to as a "web browser" or simply a "browser" fix sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) fir the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java JavaScript, ActiveX, any other scripting language, such as VBScript, and many other programming languages as are well known may be used, (Java™ is a trademark of Sun Microsystems, Inc.).

Figure 1B:
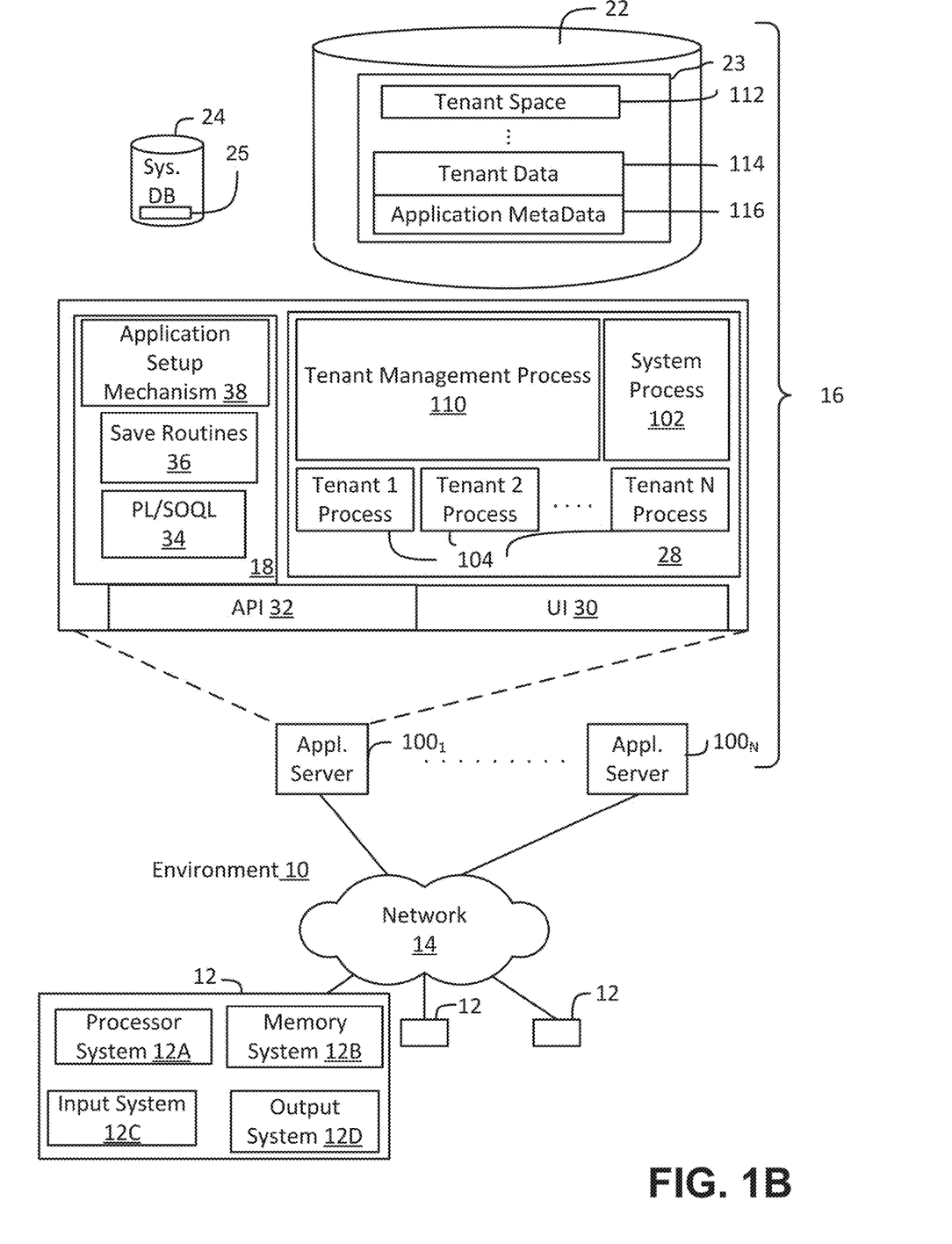
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10 but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $\mathbf{100_1}$-$\mathbf{100_N}$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided, Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications, Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12, In some other implementations, the environment 10 may not have the same elements as those listed above or may have other elements instead of or in addition to, those listed above.

Each application server 100 can be communicably coupled with tenant database 22 and system database 24, for example, having access to tenant data 23 and system data 25, respectively, via a different network connection. For example, one application server $\mathbf{100_1}$ can be coupled via the network 14 (for example, the Internet), another application server $\mathbf{100_{N-1}}$ can be coupled via a direct network link, and another application server $\mathbf{100_N}$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MIS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITLES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. ENABLING A CUSTOM MACHINE LEARNING SERVICE IN AN ENTERPRISE MOBILE APPLICATION ON A MOBILE DEVICE

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for are on-demand database service capable of supporting multiple tenants, the present implementations are not limited to multi-tenant databases or deployment on application servers. Implementations may be practiced using other data persistent technologies such as other database architectures. i.e., ORACLE® DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory KNM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

Embodiments describe a system that enables use of a custom machine learning framework in a mobile enterprise application on a mobile device. The database system 16 includes a platform as a service (PaaS), which enables customers/tenants to create custom versions of a mobile enterprise application. According to the disclosed embodiments, methods are described that enable the custom mobile enterprise application to use a desired machine learning (ML) framework, such as Apple's Core ML. In embodiments, the service platform enables the use of the machine learning framework in the mobile enterprise application according to the following process. First, the mobile enterprise application is modified to include a native code layer capable of downloading invoking trained ML models. The enterprise database system then receives a tenant upload of a trained ML model and configuration data defining the ML framework for using the trained ML model. In one embodiment, the configuration data defines a format of the input data and the format of the output data of the trained ML model. The database system then downloads the trained ML model to a mobile device running the mobile enterprise application and an API to access the trained ML model. During execution of the mobile enterprise application on the mobile device, the API is used to access the trained ML model with specified input data in the defined input format and to receive specific output data in the defined output format from the trained ML model. As a result of this process, a tenant will be able to use a trained Core ML model in a mobile enterprise application, such as Salesforce Lightning Component or Web Component, or other Salesforce web based apps such as Visualforce page.

This solution is advantageous because it allows a customer to upload their own Core ML model and use the ML model in their customized enterprise application. Machine Learning models are often domain specific and are important intellectual properties for Salesforce customers, so it is a great advantage for enterprise customers to be able to use their own models.

Figure 2:
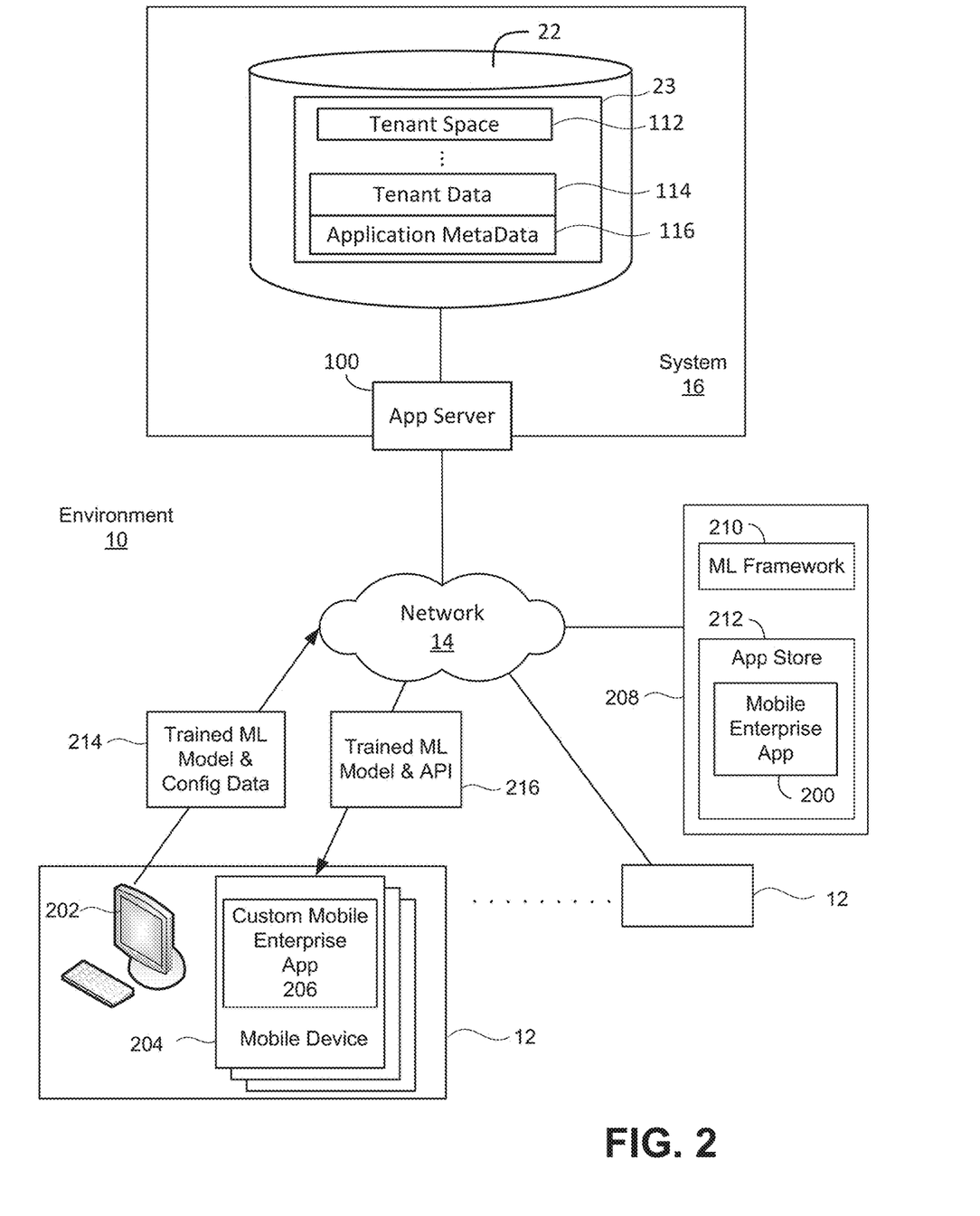
FIG. 2 is a diagram illustrating an example system implementation for enabling a mobile enterprise application to use a machine learning (ML) service in a multi-tenant database environment.

FIG. 2 is a diagram illustrating an example system implementation for enabling a mobile enterprise application to use a machine learning (ML) service in a multi-tenant database environment. As described with respect to FIG. 1B, the environment 10 includes user systems 12 in communication through the network 14 with one or more app servers 100 of database system 16. In one example embodiment, the database system includes a platform as a service (PaaS), e.g., the Salesforce Lightning Platform, which makes one or more mobile enterprise applications 200 available to users of customers/tenants. As is well known, an enterprise application refers to computer software used to satisfy the needs of an organization rather than individual users a mobile application, and a mobile application, commonly referred to as an app, is software designed to run on a mobile device 204, such as a smartphone or tablet computer. Through the PaaS, the tenant users are able to customize the mobile enterprise application 200 to create a custom mobile enterprise application 206 suitable for that organization.

The database system 16 can provide tenant access to multiple hosted (standard and custom) applications, including a CRM application. User (or third party developer) applications, which may or may not include CRM, may be supported by the application platform 18. With the advent use of machine learning, customers of cloud computing services have an increased demand for machine learning services in their mobile apps. One or more mobile operating system (OS) providers 208 meet this need by providing a machine learning (ML) framework 210 to their mobile operating systems to speed up application tasks involving artificial intelligence. As an example, Apple Inc. introduced to the iOS mobile operating system a machine learning framework 210 called Core ML that integrates ML models into iOS apps so that machine learning models run on mobile devices 204, rather than on a server.

Figure 3:
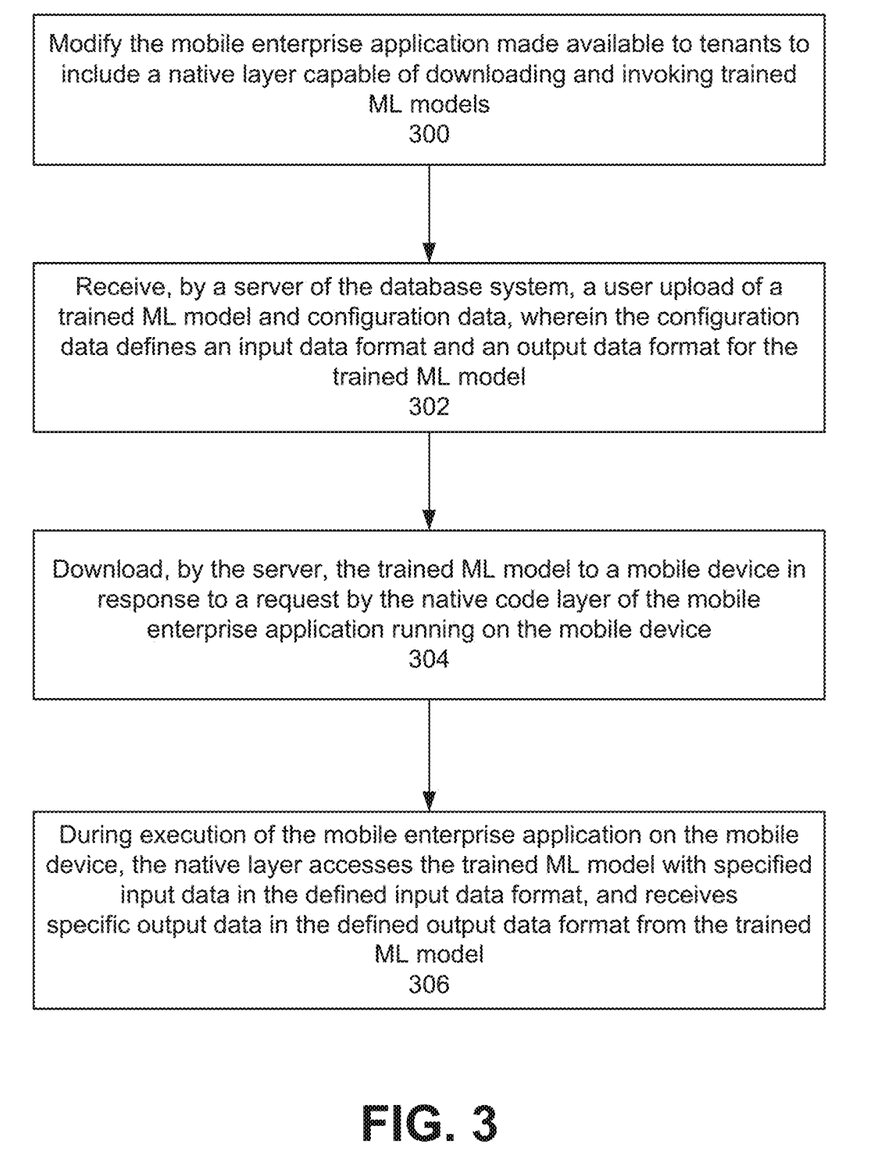
FIG. 3 is a flow diagram illustrating a process for enabling the use of the ML service in a custom mobile enterprise application.

The disclosed embodiments enable the custom mobile enterprise application 200 to use of the ML service 208 on the mobile device 204 within a multi-tenant database system environment, as described in FIG. 3.

FIG. 3 is a flow diagram illustrating a process for enabling the use of the ML service in a custom mobile enterprise application. Referring to FIGS. 2 and 3, the process may begin by a provider of the database system 16 modifying the mobile enterprise application 200 made available to one or more tenants to include a native layer (also called a native code layer) capable of downloading and invoking trained ML models (block 300). It should be noted that at least a portion of the tenants of the database system 16 may customize the mobile enterprise application 200 to create different custom mobile enterprise applications 200.

One or more app servers 100 of the database system 16 receive an upload of a trained ML model and configuration data 214 from a tenant user, wherein the configuration data defines an input data format and an output data format for the trained ML model (block 302). The trained ML model is obtained by applying a machine learning algorithm to a set of training data. Once trained, the ML model can be used to perform some function based on new input data, such as image analysis from photos, natural language processing from speech or text, sound analysis of sounds, and making predictions. For example, a ML model trained to identify objects from a large amount of training photos can be used to identify objects from new photos captured on a mobile device, or a ML model trained on a region's historical house prices may be able to predict a house's price when given the number of bedrooms and bathrooms.

In one embodiment, the trained ML model and configuration data 214 are uploaded to the database system 16 from a user computer 202, such as a laptop, desktop or workstation. In one embodiment, the trained ML model and configuration data 214 are stored in the tenant storage space 112 of tenant database 22. For example, the trained ML model may be stored in the tenant data storage 114, while the configuration data may be stored in the application metadata 16. The app server 100 may return to the user computer 202 a URL of the storage location of the trained ML model in tenant storage space 112.

The app server 100 downloads the trained ML model to the mobile enterprise application 200 running on the mobile device 204 in response to a request by the native code layer of the mobile enterprise application 200 (block 304). In an embodiment, the tenant may load the mobile enterprise application 200 on the mobile device 204, or may first customize the mobile enterprise application 200 to create the custom mobile enterprise application 206, which is then loaded on the mobile device 204. For purposes of this description, the terms mobile enterprise application 200 and custom mobile enterprise application 206 may be used interchangeably. In one embodiment, the mobile enterprise application 200/206 may be downloaded and installed on mobile devices 204 of a tenant through an app store 212 of the mobile OS provider 208 or from the database system 16. In one embodiment, the database system 16 also generates an API 216 for accessing the mobile enterprise application and downloads both the trained ML model and the API 216 to the native code of the mobile enterprise application 200/206.

During execution of the mobile enterprise application 200 on the mobile device, the native layer accesses the trained ML model with specific input data in the defined input data format, and receives specific output data in the defined output data format from the trained ML model (block 306). In one embodiment, the native layer passes the specific input data from the mobile enterprise application 200 to the trained ML model, and forwards the output data from the trained ML model back to the mobile enterprise application 200 for further operation. For example, assuming the trained ML model recognizes various types of food, the photos from the mobile device could designated as input to the trained ML model, while names of the food identified in the photos could be received as output of the trained ML model and passed on to the mobile enterprise application 200 for further operation, such as being displayed to the user.

According to the above process, different tenants of the database system 16 are able to use a ML service, such as a trained Core ML model in a Salesforce Lightning Component or Web Component, or other Salesforce web based apps such as Visualforce page.

Figure 4:
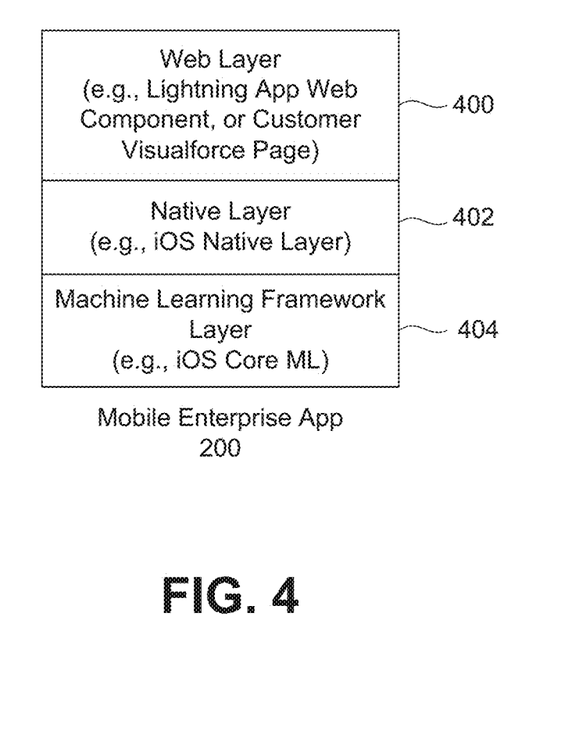
FIG. 4 illustrates a diagram of components comprising the mobile enterprise application.

FIG. 4 illustrates a diagram of components comprising the mobile enterprise application 200. In an embodiment, the mobile enterprise application 200 is implemented as a hybrid structure comprising a web layer 400, a native layer 402, and a machine learning framework layer 404. The web layer 400 is an abstraction layer that contains the application code (e.g., the Lightning Framework and a customer application such as a Lightning app) and specifies shared communications protocols and interface methods used by hosts in the database system 16. The native layer is provided by the provider of the database system 16 and uses the trained ML model through a Core ML framework API. The web 400 layer communicates to the native layer 402 through the API generated based on input and output data definition.

The native layer 402 is added to the mobile enterprise application 200 to download and invoke the trained ML model. The native layer 402 and the web layer 400 may communicate via messaging. The API generated by the provider of the database system 16 allows mobile enterprise application 200/206 to access the native layer 402, which invokes the trained ML model. The API is generated based on the input and output format provided by the tenant. The API wraps up the messaging between the web layer 400 and the native layer 402 as a convenient way for enterprise mobile application 200/206 to invoke the trained ML model through the native layer 402. The native layer 402 is coded in a specific programming language, such as Objective C for iOS or Java or Kotlin for Android. In another embodiment, other platforms, in particular, Xamarin and React Native, could also be used to build the mobile enterprise application 200/206 to run on more than one platform/OS. During execution of the mobile enterprise application 200/206 on the mobile device, the web layer 400 invokes the API, which invokes the native layer 402 to accesses the trained ML model with specified input data in the defined input data format, and receives specific output data in the defined output data format from the trained ML model The machine learning framework layer 404 is an interface, library or a tool that allows developers/users to build machine learning models more easily and quickly, without getting into the details of underlying algorithms. For mobile applications, the machine learning framework layer 404 is typically provided by a mobile OS provider, such as Apple Inc. or Google. Examples of the machine learning framework layer 404 include Core ML from Apple Inc. for use with the iOS operating system; ML Kit from Google for use with either iOS or the Android operating system; and Neural Networks API for use with Android. Once the trained ML model is downloaded, the machine learning framework layer 404 interacts with the trained ML model using data local on the mobile device 204. The machine learning framework layer 404 comprises a plurality of object classes and the native layer 402 makes generic input calls to the machine learning framework layer 404, which creates objects. One example of locally stored input data is a user's photos stored in the photo library of the mobile device 204, while another example is text or speech entered by the user that is analyzed by the trained ML model.

Figure 5:
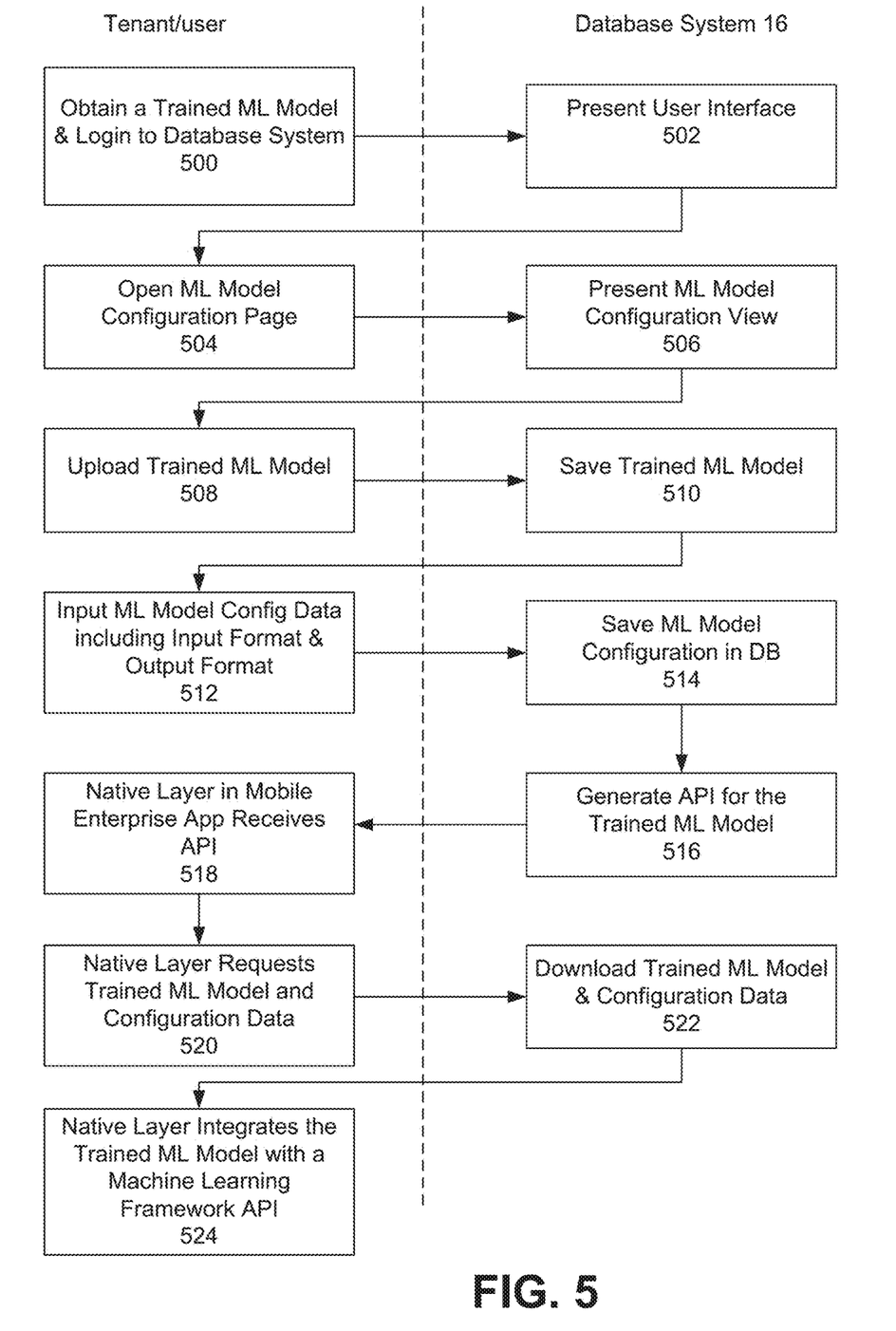
FIG. 5 illustrates the process of enabling the mobile enterprise application to use the ML framework in further detail.

FIG. 5 illustrates the process of enabling the mobile enterprise application to use the ML framework in further detail, Tenant/user operations are shown on the left-hand side of FIG. 5, while database system operations are shown on the right-hand side. The process may begin by a tenant user obtaining a trained ML model and logging into the database system 16 from a remote computer such as a desktop/laptop (block 500). Once the user logs in, the database system presents a user interface providing the user with several options (block 502). The user selects and opens the option or tab for navigating to a ML model configuration page (block 504). In response, the database system 16 presents the ML model configuration page (block 506). The user uses the ML model configuration page to upload the trained ML model (block 508).

Figure 6:
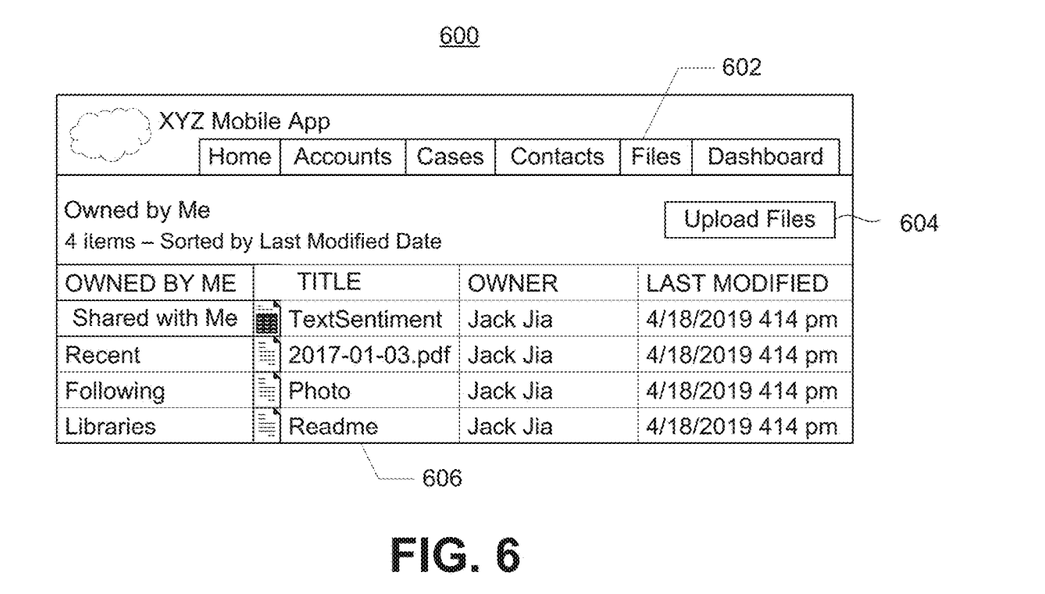
FIG. 6 illustrates a screen shot of an example user interface displayed by the database system to the tenant user on the user system.

FIG. 6 illustrates a screen shot of an example user interface 600 displayed by the database system 16 to the tenant user on the user system 12. In one embodiment, the user interface 600 comprises the ML model configuration page. The "Files" tab 602 is selected and shows the files 606 uploaded to the tenant database 22 (FIGS. 1B and 2) via an "Upload Files" button 604. One example of uploaded files 604 is a trained ML model 604 called Text Sentiment, which can analyze entered text segments and output text labels of emotions expressed in the entered text segments.

Referring again to FIG. 5, the database system receives and saves the uploaded trained ML model in the tenant database 22 or other persistent technologies such as a Simple File Sharing (block 510). The user also inputs ML model configuration data including the format of input data and the format of output data of the ML model (block 512). The database system 16 receives and saves the ML model configuration in the tenant database 22 (block 514). It should be readily understood by one of ordinary skill in the art that the order of blocks 508, 510, 512, and 514 is just one example and the operations may be performed in various other orders. The database system 16 generates an API for the trained ML model 516, which is also stored in the tenant database 22 (block 516).

Once the tenant has created the custom mobile enterprise application 206 and loaded the custom mobile enterprise application 206 on a plurality of mobile devices 204, the native layer 402 on each mobile device 204 detects that a new trained ML model is available on the database system 16 and begins the downloading process by downloading the API or prompting the user to start (block 518). The native layer 402 also requests the trained ML model and configuration data from the database system 16 (block 520). In response, the database system 16 downloads the trained ML model and configuration data to the requesting mobile devices 204 (block 522). The order of blocks 518 and 520 are interchangeable.

Figure 7:
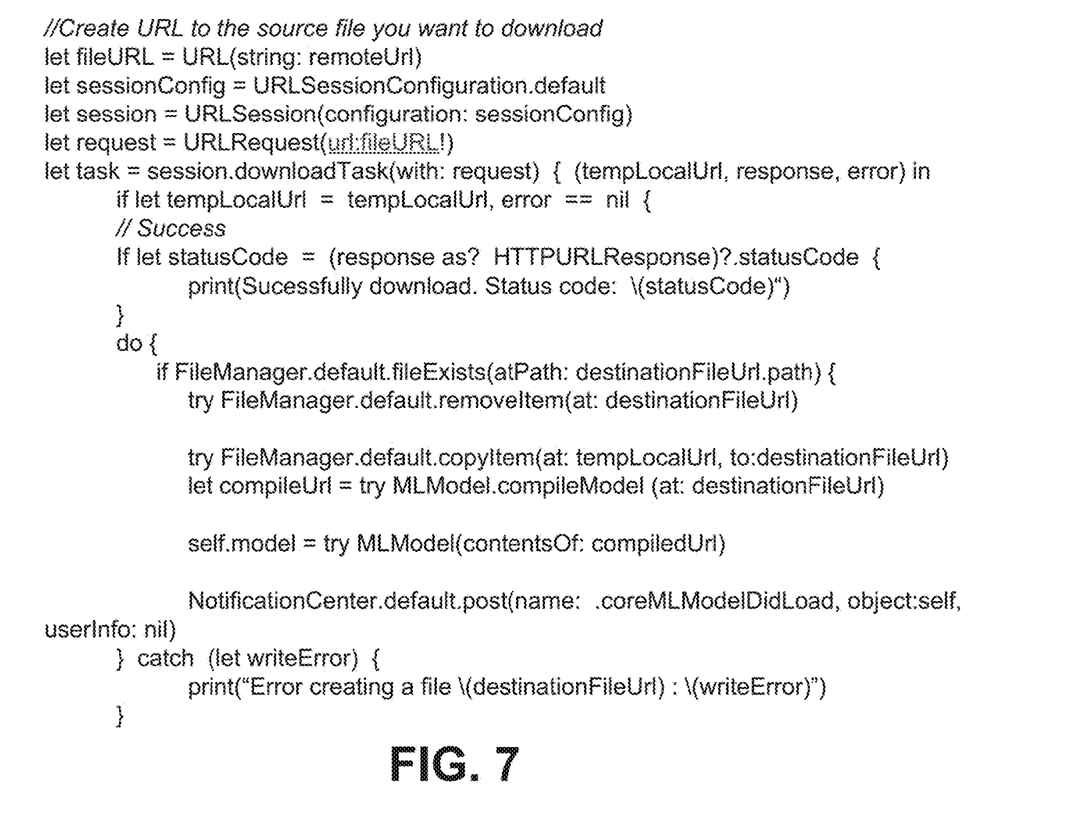
FIG. 7 illustrates example demo code for example native code inside the mobile enterprise application and for downloading and compiling the trained ML model so that the trained ML model can be used within the mobile enterprise application.

FIG. 7 illustrates example demo code as example native code inside the mobile enterprise application 200/206 for downloading and compiling the trained ML model so that the trained ML model can be used within the mobile enterprise application 200/206. The demo code downloads the trained ML model from server and saves the trained ML model on the mobile device. Then the trained ML model is compiled, and a notification is sent to notify the UI that the model is now loaded and ready.

Referring again to FIG. 7, the native layer 402 integrates the downloaded trained ML model with a machine learning framework layer API (block 524).

Figure 8:
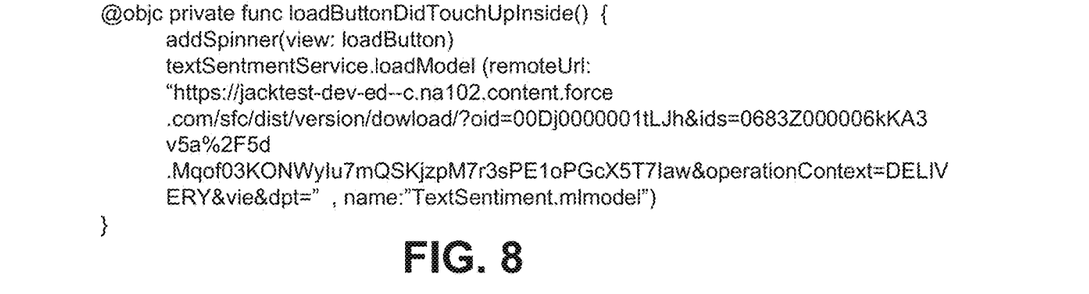
FIG. 8 illustrates example demo code inside the mobile enterprise app 200/206 for triggering the loading the trained ML model.

FIG. 8 illustrates example demo code inside the mobile enterprise app 200/206 for triggering the loading the trained ML model. In this example, the demo code shows that after a user clicks a button, the downloading of the trained ML model is started.

Once the trained ML model is loaded into the custom mobile enterprise application 206 and the custom mobile enterprise application 206 is invoked, the specified input is passed to the machine learning framework layer 404 and the output is passed back to the web layer 400 for further processing and/or display.

Figure 9A:
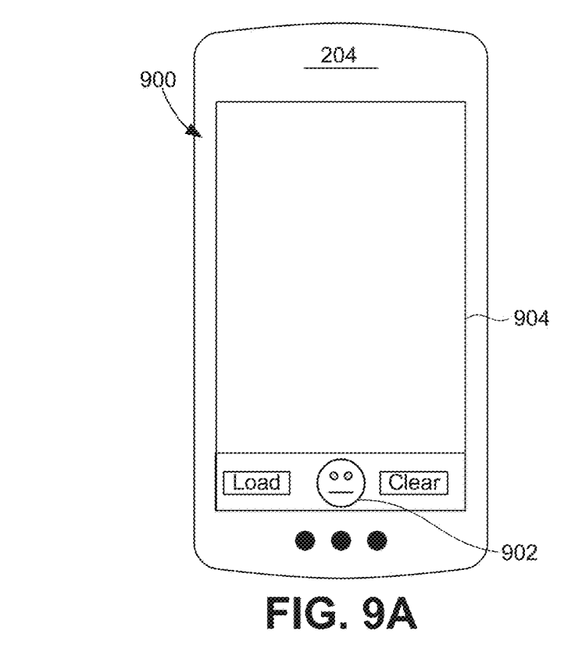
FIGS. 9A-9C illustrate example screen shots of a user interface (UI) of the mobile enterprise app running a trained ML model called Text Sentiment on mobile device
Figure 9B:
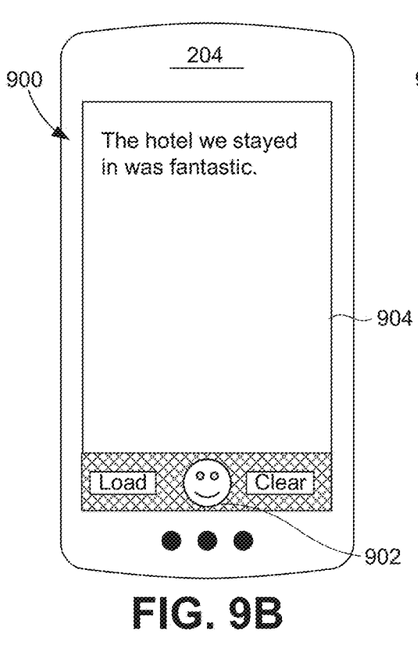
Figure 9C:
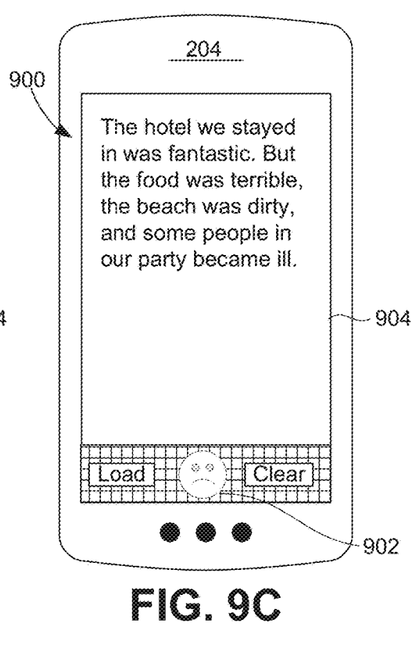

FIGS. 9A-9C illustrate example screen shots of a user interface (UI) of the mobile enterprise app 200/206 running a trained ML model called Text Sentiment on mobile device 204. The UI 900 display a text entry space 904 for user entry of text (by typing or speaking), and an emote 902 below showing the emotion expressed in the entered text. Example emotion emotes 902 may include a neutral face, a happy face and a sad face. The UI 900 may also include a "Load" button 906 for triggering the loading the trained ML model and a "Clear" button for clearing the ML model.

Once the user clicks the "Load" button 906, the trained ML model is loaded in the mobile enterprise app 200/206. If successfully loaded, the user can enter text, otherwise an error message may be displayed. Initially, the emote 902 is neutral, as shown in FIG. 9A. As the user enters text, the trained ML model determines that the entered text expresses happiness, so the emote 902 is updated to a smiley face and the background may change to an appropriate color, as shown in FIG. 9B. As the user continues to type, the trained ML model determines that the entered text expresses sadness, so the emote 902 is updated to a frowny face and the background may change to a different color, as shown in FIG. 9C.

Methods and systems for enabling a custom mobile enterprise application to use a desired machine learning (ML) framework have been disclosed.

What is claimed is:

1. A computer-implemented method comprising:
   receiving, by one or more servers of a development platform, an upload of a trained machine learning (ML) model and configuration data from a tenant user, for use by a mobile enterprise application that is made available to one or more tenants of the development platform, the mobile enterprise application capable of invoking the trained ML model, wherein the configuration data defines an input data format and an output data format of the trained ML model;
   generating, by the one or more servers, an Application Programming Interface (API) based on the configuration data and downloading the API to the mobile enterprise application, wherein the generating the AP1 is performed without using an API provided by the tenant user, wherein the generated API is configured to pass input in the input data format to the trained ML model and configured to receive output in the output data format from the trained ML model for further processing or display; and
   downloading, by the one or more servers, the trained ML model to the mobile enterprise application running on a mobile device in response to a request by the mobile enterprise application.

2. The computer-implemented method of claim 1, further comprising: modifying the mobile enterprise application to include a hybrid structure comprising a web layer, a native layer, and a machine learning framework layer.

3. The computer-implemented method of claim 2, further comprising: adding the native layer to the mobile enterprise application to download and invoke the trained ML model, wherein once the trained ML model is downloaded, the machine learning framework layer interacts with the trained ML model using data local on the mobile device.

4. The computer-implemented method of claim 1, further comprising: obtaining the trained ML model by applying a machine learning algorithm to a set of training data.

5. The computer-implemented method of claim 1, further comprising storing, by the one or more servers, the trained ML model and the configuration data in a tenant storage space of a tenant database.

6. The computer-implemented method of claim 5, wherein the tenant database includes a plurality of individual tenant storage spaces for corresponding tenants.

7. The computer-implemented method of claim 6, further comprising enabling at least a portion of the tenants to customize the mobile enterprise application to create multiple custom enterprise applications.

8. The computer-implemented method of claim 1, wherein the one or more servers receive the upload of the trained ML model and the configuration data from a computer of the tenant user, the computer including at least one of a laptop, a desktop and a workstation.

9. A non-transitory computer-readable medium containing program instructions, which when executed by one or more processors, cause the one or more processors to carry out the steps of:
   responsive to a user of the development platform logging in from a remote computer, presenting to a remote computer of the user of the development platform a user interface (UI) displaying a machine learning (ML) model configuration page:
   receiving from the ML model configuration page a user upload of a trained ML model and configuration data, the configuration data including an input data format and an output data format of the trained ML model;
   storing the uploaded trained ML model and the configuration data in a tenant database of the user in the development platform;
   generating, by the development platform and based on the configuration data, an Application Programming Interface (API) for the trained ML model and storing the API in the tenant database of the user, wherein the generating the API is performed without using an API provided by the user, wherein the generated AP1 is configured to pass input in the input data format to the trained ML model and configured to receive output in the output data format from the trained ML model for further processing or display; and
   downloading the trained ML model and the generated API and the configuration data to a mobile enterprise application installed on a mobile device.

10. The computer-readable medium of claim 9, further including program instructions for: modifying the mobile enterprise application to include a hybrid structure comprising a web layer, a native layer, and a machine learning framework layer.

11. The computer-readable medium of claim 10, further including program instructions for: adding the native layer to the mobile enterprise application to download and invoke the trained ML model, and adding the machine learning framework layer to interact with the trained ML model using data local on mobile devices.

12. The computer-readable medium of claim 9, further including program instructions for: storing the uploaded trained ML model and the configuration data in a tenant database of the user in the development platform.

13. The computer-readable medium of claim 12, further including program instructions for: providing the tenant database with a plurality of individual tenant storage spaces for corresponding tenants.

14. The computer-readable medium of claim 13, further including program instructions for: enabling at least a portion of the tenants to customize the mobile enterprise application to create multiple custom enterprise applications.

15. A multi-tenant development platform, comprising:
   a mobile enterprise application installed on a plurality of mobile devices of a tenant, the mobile enterprise application having a hybrid structure comprising a web layer and a native layer; and
   one or more servers including instructions stored thereon that, in response to execution by the multi-tenant development platform, are operable to:
      receive, by the one or more servers, an upload of a trained machine learning (ML) model and configuration data from a tenant user, wherein the configuration data defines an input data format and an output data format of the trained ML model;
      generate, by the one or more servers and based on the configuration data, an Application Programming Interface (API) for the trained ML model and download the API to the mobile enterprise application on the mobile devices, wherein the API is generated without using an API provided by the tenant, wherein the generated API is configured to pass input in the input data format to the trained ML model and configured to receive output in the output data format from the trained ML model for further processing or display; and
      download, by the one or more servers, the trained ML model to the mobile enterprise application on the plurality of mobile devices in response to a request by the native layer of the mobile enterprise application.

16. The multi-tenant development platform of claim 15, wherein the one or more servers store the trained ML model and the configuration data in a tenant storage space of a tenant database in the multi-tenant development platform.

17. The multi-tenant development platform of claim 15, wherein the multi-tenant development platform includes a plurality of individual tenant storage spaces for corresponding tenants.

18. The multi-tenant development platform of claim 17, wherein at least a portion of the tenants customize the mobile enterprise application to create multiple custom enterprise applications.

19. The multi-tenant development platform of claim 15, wherein the one or more servers receive the upload of the trained ML model and the configuration data from a computer of the tenant user, the computer including at least one of a laptop, a desktop and a workstation.

* * * * *